United States Patent
Burger et al.

(10) Patent No.: US 6,477,172 B1
(45) Date of Patent: Nov. 5, 2002

(54) DISTRIBUTED TELEPHONY RESOURCE MANAGEMENT METHOD

(75) Inventors: Eric William Burger, McLean, VA (US); Andy Spitzer, Herndon, VA (US)

(73) Assignee: Ulysses ESD, San Jose, CA (US)

( * ) Notice: Subject to any disclaimer, the term of this patent is extended or adjusted under 35 U.S.C. 154(b) by 0 days.

(21) Appl. No.: 09/318,178

(22) Filed: May 25, 1999

(51) Int. Cl.[7] .............................................. H04L 12/28
(52) U.S. Cl. ...................................... 370/406; 370/230
(58) Field of Search ................................ 370/359, 402, 370/403, 442, 438, 363, 390, 389, 395.2, 395.21, 395.3, 395.31, 401, 404, 405, 409, 412, 416, 443, 460, 468, 450, 439, 449, 458, 406

(56) References Cited

U.S. PATENT DOCUMENTS

| | | | |
|---|---|---|---|
| 4,791,639 A | | 12/1988 | Afheldt et al. ................. 370/58 |
| 4,879,743 A | | 11/1989 | Burke et al. ................. 379/142 |
| 5,136,580 A | * | 8/1992 | Videlock et al. ............. 370/403 |
| 5,493,569 A | * | 2/1996 | Buchholz et al. ............ 370/442 |
| 5,581,553 A | | 12/1996 | Cave et al. .................. 370/362 |
| 5,764,639 A | * | 6/1998 | Staples et al. ............... 370/359 |
| 6,272,146 B1 | * | 8/2001 | Bowater et al. ............. 370/438 |

OTHER PUBLICATIONS

MVIP Overview (Dec. 23, 1998), "An Overview," 1–9. Last update Dec. 23, 1998.
MVIP Documentation (Dec. 23, 1998), "MVIP Documentation," 1–3. Last update Dec. 23, 1998.
H.100 (Dec. 23, 1998), "H.100: The CTI Bus for PCI Specification," 1–1. Last update Dec. 23, 1998.
American–Tel–A–System, Inc. (1998), "XDS MVIP Boards: XDS MVIP MC3 Multi–Chassis Interconnect Board," 1–2. Last update Dec. 23, 1998.

(List continued on next page.)

Primary Examiner—Wellington Chin
Assistant Examiner—William Schultz
(74) Attorney, Agent, or Firm—Pennie & Edmonds LLP

(57) ABSTRACT

To form communication connections in a set of nodes, the set of nodes is arranged so that at least a subset of the nodes form a ring. Each node in the subset of nodes is coupled to first and second neighboring nodes in the subset by a set of inter-node communication connections. An external communication is received at one of the nodes. The external communication requests access to a communication resource of a specified type. The receiving node determines whether it has an available communication resource of the specified type. If not, the following additional steps are performed. A resource request message is sent to the first and second neighboring nodes of the receiving node to request allocation of a communication resource of the specified type. Each of the first and second neighboring nodes determines whether that node has an available communication resource of the specified type. If not, the neighboring node transmits another resource request message to one of its neighboring nodes other than the node from which the resource request message was received. When any node determines that it has an available communication resource of the specified type, a communications path is formed between the receiving node and the communication resource of the specified type via the inter-node communication connections therebetween.

23 Claims, 7 Drawing Sheets

OTHER PUBLICATIONS

GO–MVIP, Inc., "The MVIP Book," Fowlkes, G. (Amtelco), Chapter 10: Multi–Chasis Interconnections, 2–13. Oct. 1, 1995.

Tobagi, F.A. and Gerla, M., SAMS (1993), Prentice Hall, Eighth Edition, Reference Data for Engineers: Radio, Electronics, Computer, and Communications, "Chapter 26: Computer Communications Networks," 26–1—26–39.

FDDI Info, "History," 1–9. http://web.syr.edu/~jmwob...–comp.dcom.lans.fddi. Revision 4, Jan. 4, 1996.

CMP Media Inc. (1998), "FDDI Fundamentals," 1–2. http://www.data.com/ Tutor...DI Fundamentals.html.

Bay Networks, Inc. (1996), White Paper, "Networking: A Primer," 1–8. http://www.baynetworks.co...apers/wp–primer.html.

Cisco Systems, Inc. (1989–1997), "Fiber Distributed Data Interface," 1–5. http://www.cisco.com/univer...wk/ito_doc/55773.html.

Cisco (Posted Nov. 13, 1996), "Switched Backbone LAN Technologies: Migrating FDDI to Switched Fast Ethernet," 6 pages. Web Site: Unidentified.

* cited by examiner

DISTRIBUTED TELEPHONY RESOURCE MANAGEMENT METHOD

BACKGROUND OF THE INVENTION

Communication systems route voice and data signals between local and remote devices. A communication system may have many switches that are interconnected by different forms of communication media. However, these switching systems are complex and require one or more machines that are designated as a controller. Typically, service providers have switches at various geographical locations and interconnect those switches using various methods, such as T1 or ISDN-PRI.

In one communication system, a separate central controller is connected to each switch and routes calls between devices on the network. This type of communication system requires direct interconnects between the central controller and each switch, and also requires a complex routing algorithm. When a device that is not on the network wants to communicate with a target device on the network in another location, one of the switches will receive the incoming call from the device that is not on the network and the central controller will identify the target device and attempt to route the call to the switch that is connected to the target device. If the external call cannot be completed using one communication path, the system controller attempts to re-route the call via another communications path. However, this sequential re-routing increases the amount of time to complete the call.

It is noted that some communication resources, such as voice mail interface cards and a fax receive cards, are used to receive calls, rather than to connect a call to a target device.

It is a goal of the present invention to provide a simplified method of operating a set of distributed resources that does not use a central controller. Another goal is to reduce the amount of time to complete calls. Yet another goal is to provide an apparatus that performs the simplified method.

SUMMARY OF THE INVENTION

To form communication connections in a set of nodes, the set of nodes is arranged so that at least a subset of the nodes form a ring. Each node in the subset of nodes is coupled to first and second neighboring nodes in the subset by a set of inter-node communication connections. An external communication is received at one of the nodes. The external communication requests access to a communication resource of a specified type. The receiving node determines whether it has an available communication resource of the specified type. If not, the following additional steps are performed. A resource request message is sent to the first and second neighboring nodes of the receiving node to request allocation of a communication resource of the specified type. Each of the first and second neighboring nodes determines whether that node has an available communication resource of the specified type. If not, the neighboring node transmits another resource request message to one of its neighboring nodes other than the node from which the resource request message was received. When any node determines that it has an available communication resource of the specified type, a communications path is formed between the receiving node and the communication resource of the specified type via the inter-node communication connections therebetween.

The ring topology and bi-directional simultaneous search methodology provide fault tolerance and improved speed of operation.

In another aspect of the invention, each node has a processor, memory and ports for coupling to the inter-node communication connections. The memory stores a set of procedures including instructions to be executed by the processor that implement the method described above.

In this way, the present invention eliminates the need for a central controller and allows each node to operate independently. This simplified method also reduces the amount of time to complete a call because simultaneous attempts are made to set up the call in at least two directions.

DESCRIPTION OF THE PREFERRED EMBODIMENTS

Figure 1:
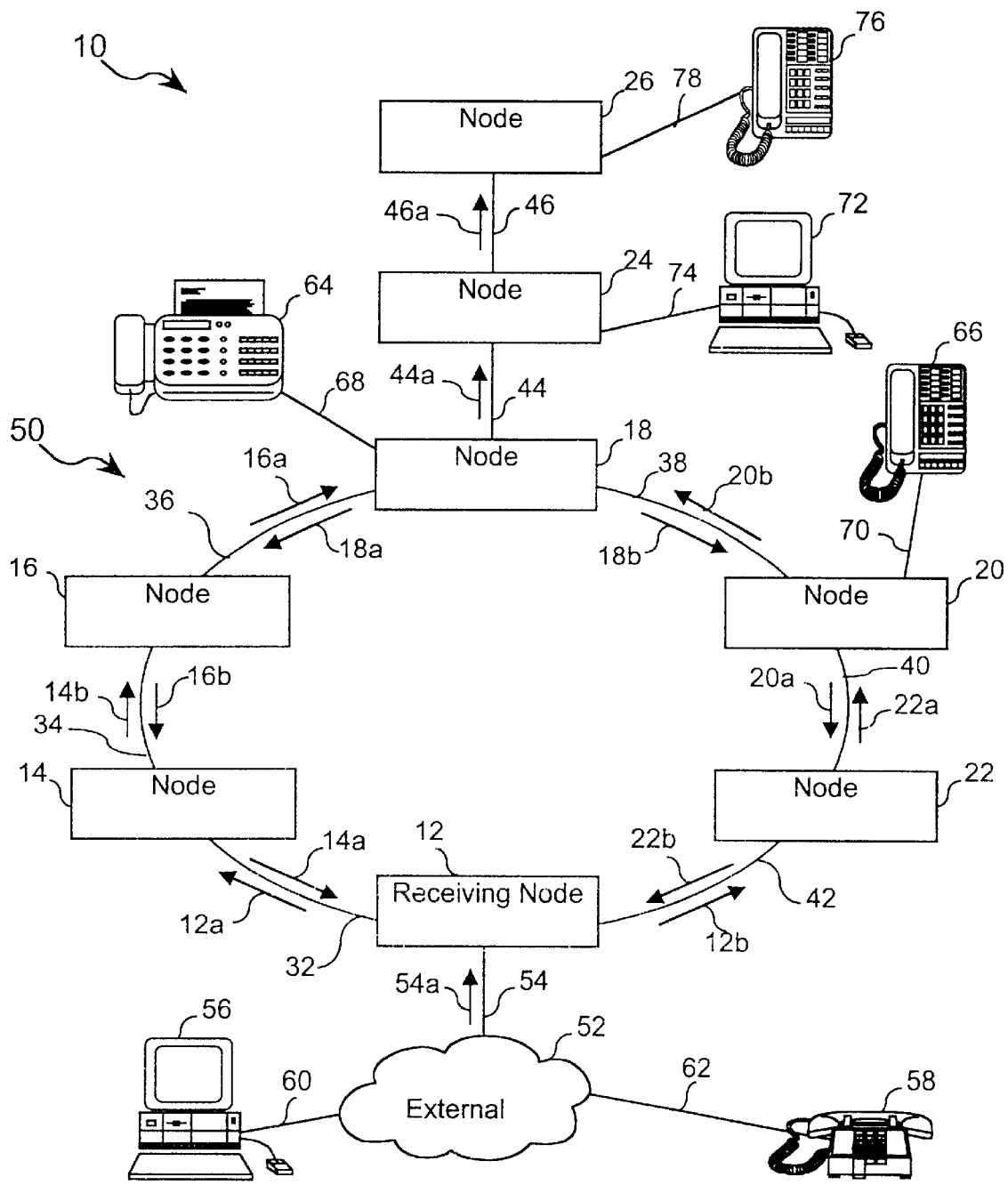
FIG. 1 is a diagram of a network which embodies the call connection method of the present invention.

In FIG. 1, a network 10 has many nodes 12–26 with inter-node communication connections 32–46. A subset of nodes 12–22 of the set of nodes forms a ring 50. Each node 12–22 in the subset of nodes is coupled to first and second neighboring nodes by a set of inter-node communication connections 32–42. For example, the neighboring nodes for node 12 are node 14 and node 22, and the neighboring nodes for node 14 are node 12 and node 16. At least one node in the subset of nodes 12–22 is a receiving node 12 which is connected to an external network 52 by an interconnection 54. Each node 12–26 transmits and receives simultaneously.

External communication devices 56, 58 are coupled to the external network 52 by interconnections 60, 62, respectively, for receiving an external communication, shown by arrow 54a.

Communication devices 64, 66 are connected to nodes 18, 20, of the ring 50 using interconnections 68, 70, respectively. The communication devices 64, 66 that are attached to the nodes 18–20 can be designated as target devices. A communication 54a (from an external device) may request access to a communication resource of a specified type. In the present embodiment, any communication resource of the requested type that can be accessed via the nodes on the ring 50 may satisfy the external request. For instance, when an external request 54a for a facsimile receiver is received at a node 12 on the ring 50, any facsimile receiver at any node 12–22 in the ring 50 may satisfy the external request. The external communication 54a may be a request to establish a data connection, a voice connection using POTS (plain old telephone service), or voice connection using VoIP (voice over internet protocol).

Nodes 12–26 have communication resources—either external or internal. Communication resources include communication devices that provide facsimile services, tone detection or generation, speech recognition, text-to-speech translation, conference services, or switched resources to external devices through a network similar to or the same as network 52. Communication resources may also include network switches, gateways, fiber data distributed interfaces (FDDI), asynchronous transfer mode (ATM) interfaces, integrated services digital network (ISDN) interfaces, synchronous optical network (SONET) interfaces, Ethernet interfaces, and packet switches. In another aspect of the invention, the communication resource may be a call connection in progress. The communication resources are not limited to physical devices, such as facsimile machines, but includes boards and application programs in computer systems that receive and store external communications for later retrieval, such as an email, voice mail or facsimile server.

The type of a communication resource may indicate a communication mode (such as FDDI, or facsimile transmission, or voice transmission) or may indicate a specific device, or may indicate a range of devices. A type of communication resource may also indicate a specific target device, or a range of target devices, that must be connectable to any communication resource that satisfies the request. For instance, the specified type of communication resource may be "a facsimile transmission device that can be connected to devices having addresses (telephone numbers) in range R."

In a preferred embodiment, a particular predetermined address, such as an ISDN phone number, is associated with communication resources of a specified type. For example, one ISDN phone number may be used for facsimile machines, while another ISDN phone number is used for speech recognition, while yet another ISDN phone number is used for conference resources. Each node 12–26 has a table associating particular addresses with particular classes of communication resources and identifying which classes of communication resources are attached to that node 12–26.

In this description, the following naming conventions will be used. Each node 12–22 has two bidirectional links to its neighboring nodes, with each bidirectional link being represented by a pair of arrows. The arrows representing outgoing communication paths or transmissions are referenced by the node number of the transmitting node followed by the letter "a" or "b." For example, node 12 sends request messages on the communication paths indicated by arrows 12a and 12b. The letters "a" and "b" are used to distinguish between the two communication paths.

Note that the outgoing transmissions from one node are incoming transmissions from the perspective of its neighboring node. For example, node 12 receives incoming transmissions, such as resource availability messages, from its neighboring nodes 14 and 22, as indicated by arrows 14a and 22b, respectively. Also note that each node has an "a" side or direction and a "b" side or direction. In other words, each node transmits and receives in an "a" direction and also transmits and receives in a "b" direction. The incoming and outgoing transmissions take place over inter-node connections 32–42. For example, the transmissions as indicated by arrows 12a and 14a take place over inter-node connection 32.

In the example shown in FIG. 1, one of the nodes on the ring 50, node 18, is coupled to a string of additional nodes that includes node 24 and node 26, which are not part of the ring 50. One of the additional nodes, node 24, connects to a target device 72, such as a computer, via interconnection 74. Another one of the additional nodes, node 26, connects to another target device 76, such as a telephone, via interconnection 78.

While the system is searching for a resource of a particular type to complete a call, node 18 may act as a proxy for nodes 24 and 26. That is, when node 18 receives a request for a communication resource that it does not have (or which is not available), it may query node 24, which will in turn query node 26. If either node 24 or 26 has an available resource of the requested type, the acceptance of the call will travel through node 18. In essence, nodes 24 and 26 act as an expansion of node 18's resources, and node 18 checks those nodes to see if they can satisfy a request before rejecting the request, or forwarding it to another node (as explained in more detail below).

Preferably, the external network 52 is a packet based network. The packet based network includes an internet, the Internet, or a private network, such as a common carrier network or a provider that provide voice and/or data service using packet switching. Alternately, the external network 52 may be a circuit switched network, such as the public switched telephone network (PSTN).

The inter-node connections 32–46 may be implemented in many ways using many different communication media. In one embodiment, the inter-node connections 32–46 are implemented with ISDN over one or more DS-1s. Alternately, the inter-node connections 32–46 may be implemented using a fiber distributed data interface (FDDI) or using any of several time domain multiplexing (TDM) technologies such as TI, Ethernet and SS7.

The inter-node connections 32–46 may use any appropriate communication media such as optical fiber, copper wire (e.g.,4-wire twisted pair or coaxial cable) or radio transmission. In a preferred embodiment, the inter-node connections 32–46 use the multi-vendor integration protocol (MVIP) standard as defined by the Global Organization for MVIP (GO-MVIP). As used in this description MVIP includes the original MVIP-90 standard, the High Capacity MVIP and the Multi-chassis MVIP standards. Preferably, the inter-node connections 32–46 use the MVIP-MC2, FDDI-II interface on fiber or copper. In another embodiment, the inter-node connections 32–46 are implemented using SONET and, in particular, MVIP-MC3.

For additional information on ISDN, the book, ISDN and Broadband ISDN, by William Stallings is hereby incorporated by reference in its entirely as background information.

The interconnections 60, 62 of the devices 56, 58, respectively, to the external network 52 are typically circuit switched connections over twisted pair. Alternately, the interconnections 60, 62 to the external network 52 are provided using radio transmission, such as cellular radio. In another alternate embodiment, the communication devices 56, 58 have a packet interface for packed-based transmission over the interconnections 60, 62.

The interconnections 68, 70, 74, 78 of the communication devices 64, 66, 72, 76, to the nodes 18, 20, 24, 26, respectively, can be implemented as described above for interconnections 60, 62 of the devices 56, 58 to the external network 52. Preferably, these interconnections 68, 70, 74, 78 use a packet-interface to communicate with the first node to which they are connected, 18, 20, 24, 26, respectively.

The communication devices 56, 58, 64, 66, 72, 76 include telephones, computers, facsimile machines, pagers, personal digital assistants and the like. In addition, the communication devices may use voice over internet protocol (VoIP), a packet-based multi-media protocol for audio and video transmission.

Significantly, the invention provides a novel method of operating the set of nodes which will be explained with reference to FIGS. 1 and 2. In step 102, the set of nodes is arranged so that at least a subset of the nodes 12–22 forms a ring 50. Each node 12–22 in the subset of nodes is coupled to first and second neighboring nodes in the subset 50 by a set of inter-node communication connections 32–42.

In step 104, an external communication, as indicated by arrow 54a, is received at one of the nodes 12. The external communication 54a requests access to a communication resource of a specified type so as to form a connection to a target device, for example, facsimile receiver 64. In step 106, the receiving node 12 determines whether it has the available communication resource of the specified type. If so, in step 107, the receiving node 12 connects the external communication 54a to the communication resource of the specified type and the process ends.

Communications between nodes, regardless of the specific signaling method used, are preferably handled as follows. Resource requests, whether to a first receiving node or to a subsequent mode, are preferably made by placing call in which the "dialed number" indicates the type of resource being requested. Thus, a call to "100-000-0001" might be used to request an outgoing fax resource, while a call to another number would be used to request a voice line resource. Calls to subscriber voice mail box resources might be assigned a bank of numbers such as 100-010-xxxx, where "xxxx" identifies the subscriber whose voice mail box is being requested.

When a node has an available resource that matches a request, it may accept the resource request by completing the pending telephone connection. This will usually include sending an appropriate message, herein called a resource availability message, to the node which sent the resource request. When a node does not have a requested resource, it may keep the connection pending for the request, and start a new connection to another node to look for the requested resource at that node. As a result, there may be a growing chain of pending connection requests as successive nodes look for the requested resource. If the resource is found, the pending connections are completed. If the resource is not found, the pending connections are dropped. This will now be explained in more detail.

Figure 2:
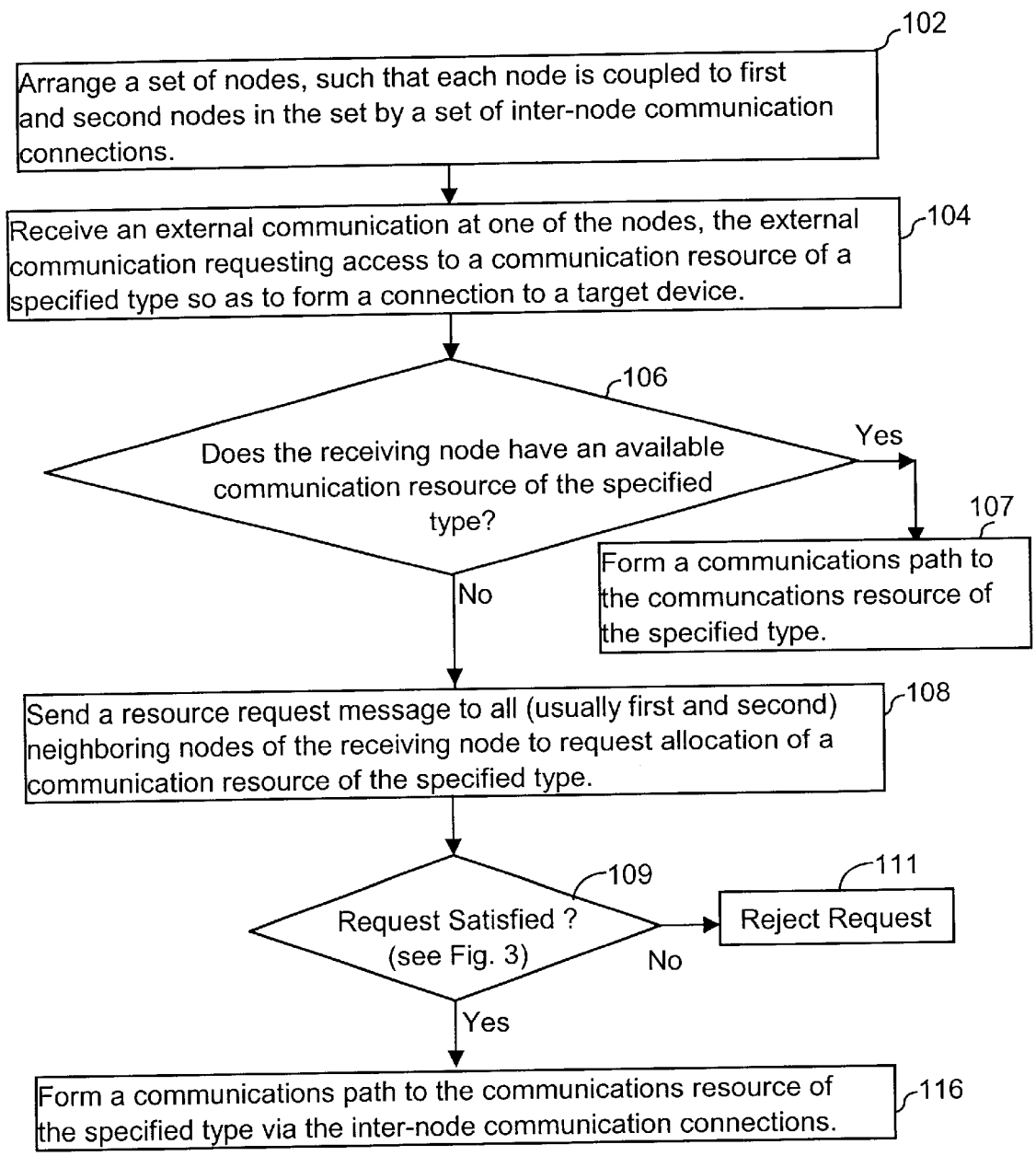
FIGS. 2 and 3 are a flowchart of a call connection method in accordance with the present invention.

Returning to the discussion of FIG. 2, if the receiving node does not have the available communication resource of the specified type, the following additional steps are performed. In step 108, a resource request message 12a, 12b is sent to the first and second neighboring nodes 14 and 22, respectively, of the receiving node 12 to request allocation of a communication resource of the specified type. These nodes will search their own resources, as well as that of other nodes in the network for the requested resource, using a message forwarding methodology to be discussed below with reference to FIG. 4. If the request is satisfied by either of the neighboring nodes or any other nodes that they forward the request to (109), the resource is allocated and the process proceeds to step 116 to form a connection between the requester and the allocated resource using the inter-node communication connections. If the request is not satisfied, the request is rejected by sending an appropriate message to the requester (111).

Figure 3:
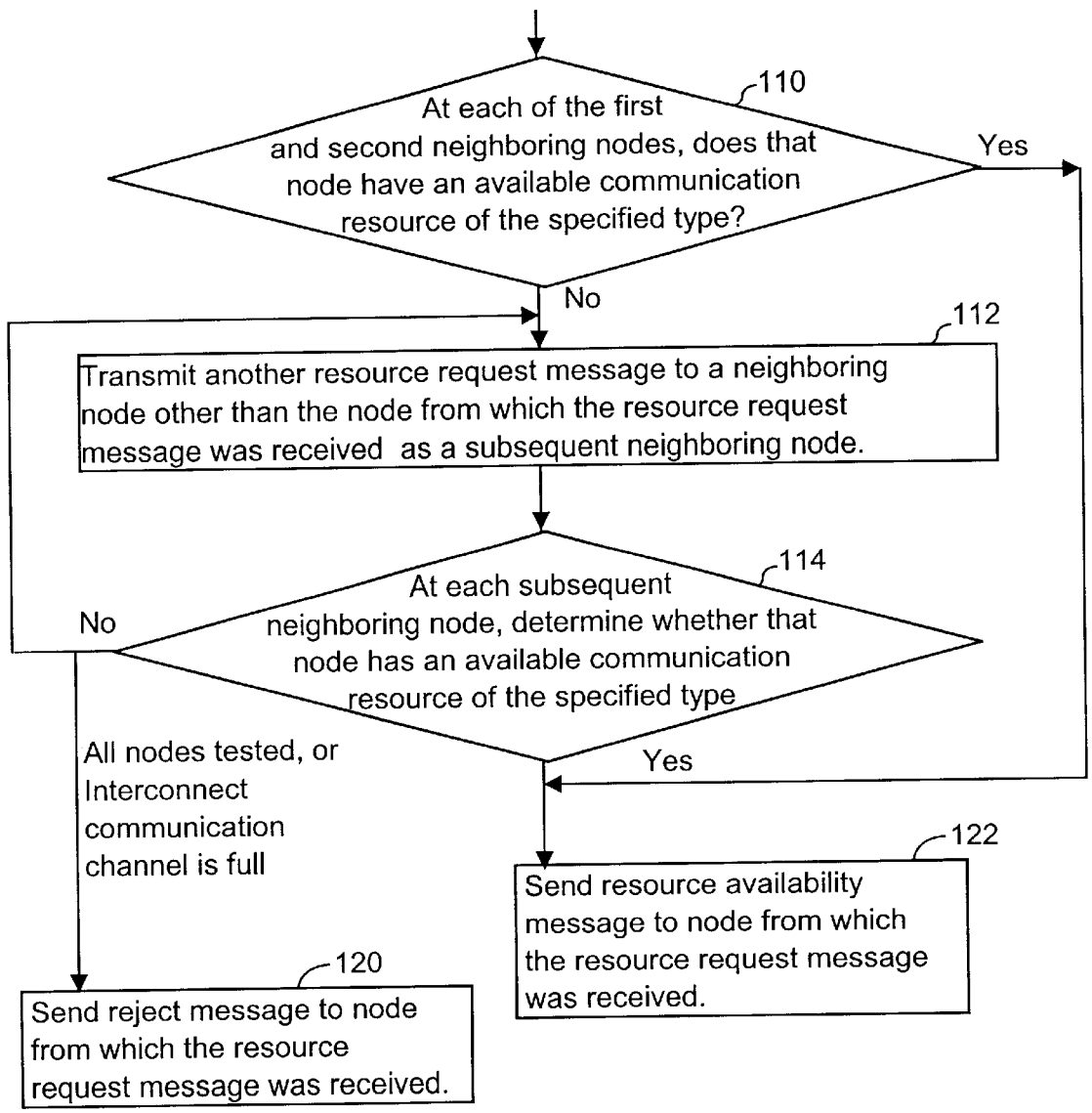

Referring to FIG. 3, once the resource request is forwarded to the receiving nodes first and second neighbors, those nodes each independently determine whether or not they have an available communication resource of the specified type (110). If so, a resource availability message is sent to the node from which the request was received (122). That message will cascade through the nodes until it reaches the requester, and a corresponding connection is formed (step 116, FIG. 2).

If a node determines that it does not have an available communication resource of the specified type (110-No), another resource request message is transmitted to a neighboring node other than the node from which the resource request message was received (112). In step 114, each subsequent neighboring node, such as node 16 and node 20 in this example, determines if it has an available communication resource of the specified type. If not, the process proceeds to step 112 and subsequent resource request messages, 14b, 16a, 22a, and 20b, are transmitted by nodes 14, 16, 22 and 20, respectively. Before sending the subsequent resource request message 14b, 16a, 22a, and 20b, each node 14, 16, 22 and 20 checks for predefined availability conditions which will be described in detail below. When step 114 determines that the subsequent neighboring node has an available communication resource of the specified type, the process proceeds to step 222.

In step 122, when any node determines that it has an available communication resource of the specified type, a resource availability message is sent to the node from which the request was received (122). As previously stated, that message will cascade through nodes until it reaches the requester, and then a corresponding connection is formed (step 116, FIG. 2).

In this example, node 18 has the available communication resource of the specified type, and assuming that resource request message 16a reaches node 18 before resource request message 20b, a communications path is formed from the external communication 54a to the target device 64 via the device interconnection 68 and inter-node connections 32, 34, 36. More specifically, when node 18 determines that it has an available resource of the requested type (e.g., a switch capable of forming a connection to telephone 64), node 18 allocates the resource and sends a resource availability message 18a towards the receiving node 12. Neighboring node 16 receives the resource availability message 18a, maintains the inter-node connection 36 to node 18 and sends another resource availability message 16b to node 14. Node 14 receives the resource availability message 16b, maintains the inter-node connection 32 to node 12, and sends another resource availability message 14a to node 12. In response, the receiving node 12 forms the communications path to the allocated resource in node 18 as described above.

When a node determines that it has no other nodes to which to forward the resource request, or the interconnect communication channel to any such node(s) is full, a reject message is sent to the node from which the request message was received (120).

Additional details of the method are described below with reference to FIGS. 5A, 5B and 6.

Figure 4:
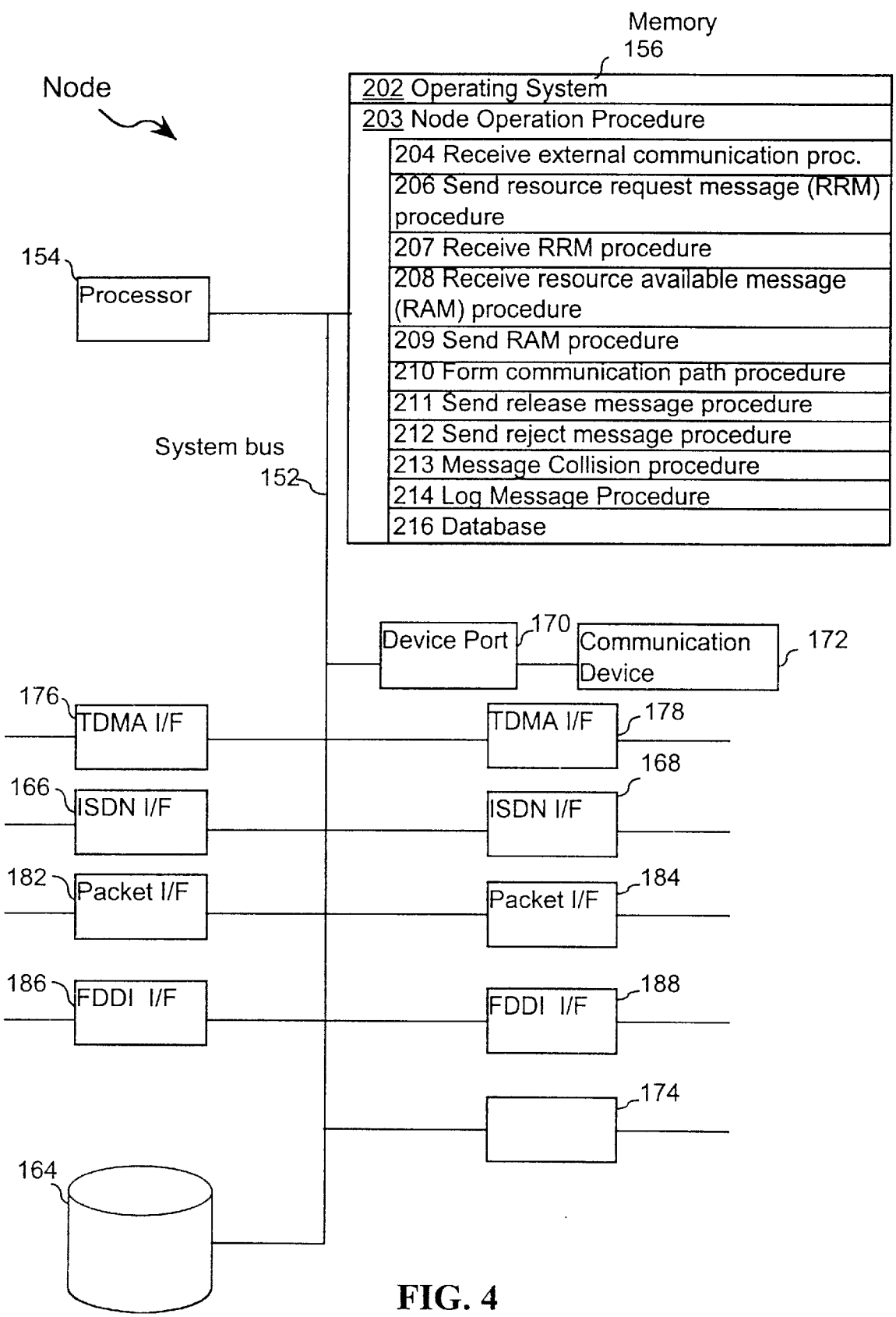
FIG. 4 is a detailed block diagram of one of the nodes of FIG. 1.

In FIG. 4, in one exemplary implementation of a node 12–26, a system bus 152, such as an ISA-bus, is coupled to many components as follows:

a processor 154, a memory 156, a disk drive 164, first and second ports, such as ISDN interfaces 166, 168, for connecting to the internode communication connections to connect to the first and second neighboring nodes, respectively, using ISDN protocols to transmit and receive messages, at least one device port 170 for connecting to a communication device 172, and optional ports 174 for connecting to the external network 52 (FIG. 1).

Each port and inter-node communication connection provides a predetermined number of communication channels.

A channel is used to provide the connection to the neighboring node. In other words, the inter-node communication connection is capable of simultaneously connecting a predetermined number channels in response to different resource request messages, one resource request message per channel, to the neighboring node at the opposite end of the inter-node communication connection.

In this embodiment, the ISDN interfaces 166, 168 use primary rate ISDN (ISDN-PRI) on a T1 line having twenty-three B-channels and one D-channel. In an alternate embodiment, the first and second ports are implemented with a TDMA interfaces 176, 178, respectively, such as a Natural Microsystems AG-Ti card, to interface to a T1.

In another alternate embodiment, the first and second ports are implemented with a packet interface 182, 184, respectively, to provide a packet-based interface.

In another alternate embodiment that uses FDDI to provide the inter-node communication connections, first and second FDDI interfaces 186, 188, such as the Amtelco XDS MVIP MC2 board, each FDDI interface 186, 188 provides up to 1,536 channels between neighboring nodes.

In yet another embodiment, first and second SONET interfaces 190, 192, such as the Amtelco XDS MVIP MC3 board, each provides up to 4,800 channels between neighboring nodes.

The memory 156 stores an operating system 202 and a node operation procedure 203 including instructions for execution by the processor. The node operation procedure 203 includes:

A receive external communication procedure 204 that causes the node to listen for and receive external communications from devices connected to the external network (see step 104 of FIG. 2).

A send resource request message procedure 206 that causes the node to select a particular channel and to send a resource request message to a designated neighboring node.

A receive resource request message procedure 207 that causes the node to listen for and receive a resource request message from a neighboring node.

A receive resource available message procedure 208 that allows the node to listen for and receive a resource availability message from or via a neighboring node.

A send resource available message procedure 209 that allows the node to send a resource available message to a designated neighboring node.

A form communication path procedure 210 that causes the node, if it is the receiving node, in response to a received resource available message, to form a communication path via the inter-node connections to an allocated resource, and to send a release message to the node that did not send the resource available message.

A send reject message procedure 211 that sends a reject message to a designated node.

A send release message procedure 212 that sends a release message to a designated node. The release message terminates the protocol for locating the requested resource. The release message is forwarded by the receiving node to its neighbor, if the neighbor is still working on processing a corresponding resource request, so as to terminate the protocol in that node as well.

A message collision procedure 213 that determines when all the nodes in a ring have received and been unable to satisfy a resource request, and then sends a device unavailable message, such as the reject message, back through the chain of nodes in both directions that indicates that no resource for connecting to the target device is available on the network.

A log message procedure 214 that maintains a log of received message requests in a database 216.

The database 216 that stores the log of received messages.

The procedures to send and receive messages are part of the signaling needed to complete a call. The procedures to send and receive messages, such as a resource request message, a reject message, a release message, and a resource available message, that are listed above are well-known and will not be described. The specific types and formats of the messages depend on the type of inter-node connections, and are well-known. For example, in a packet-based system, the resource request message is a packet with a special code indicative of a resource request message and with particular information needed to set up the call, such as specifying the type of communication resource.

In particular, a set of messages for call or communication path handling for ISDN services is specified by the International Telecommunication Union in ITU-T Recommendation Q.931. In an exemplary embodiment, using ISDN PRI Q.931, the resource request message is a Q.931 SETUP message to determine channel availability and reserve a channel. The resource available message is a Q.931 CONNECT message which also forms the connection. The reject and release messages are both Q.931 RELEASE messages to release a connection or reserved channel.

Each resource request is assigned a unique message identifier by the node that first receives the request message. The unique message identified assigned by receiving node includes the receiving node's node identifier, which is unique within the system, and a message number that is unique for the receiving node. Each resource request record stored in a log in the database 216 includes the message identifier assigned to that resource request.

The message identifier is sent as part of the resource request, resource available, reject and release messages that are sent between the nodes of the system while processing the resource request. As will be further described below, the message collision procedure 213 uses message identifiers stored in the log.

Figure 5A:
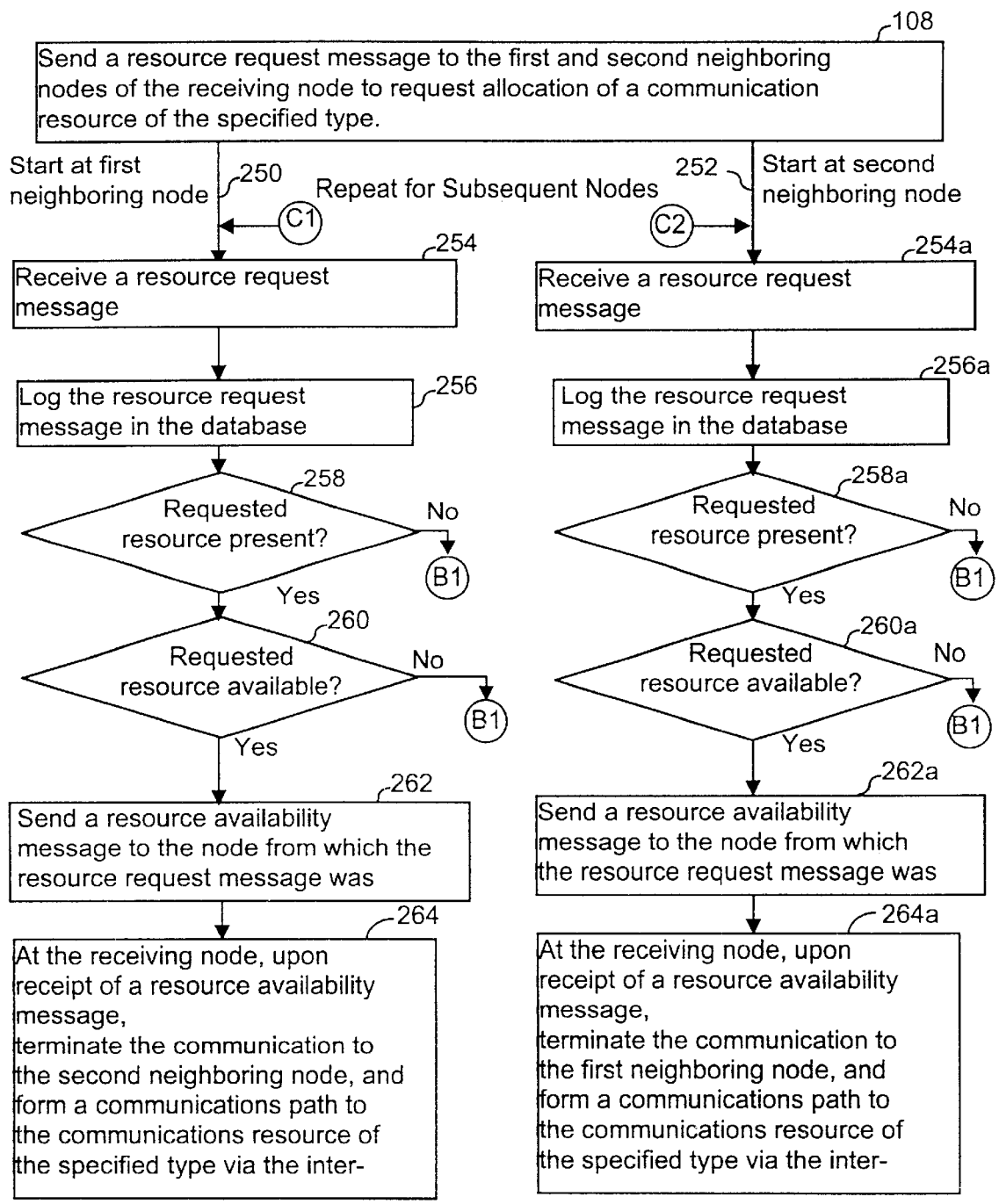
FIGS. 5A and 5B are a detailed flowchart of one embodiment of the method FIG. 2.
Figure 5B:
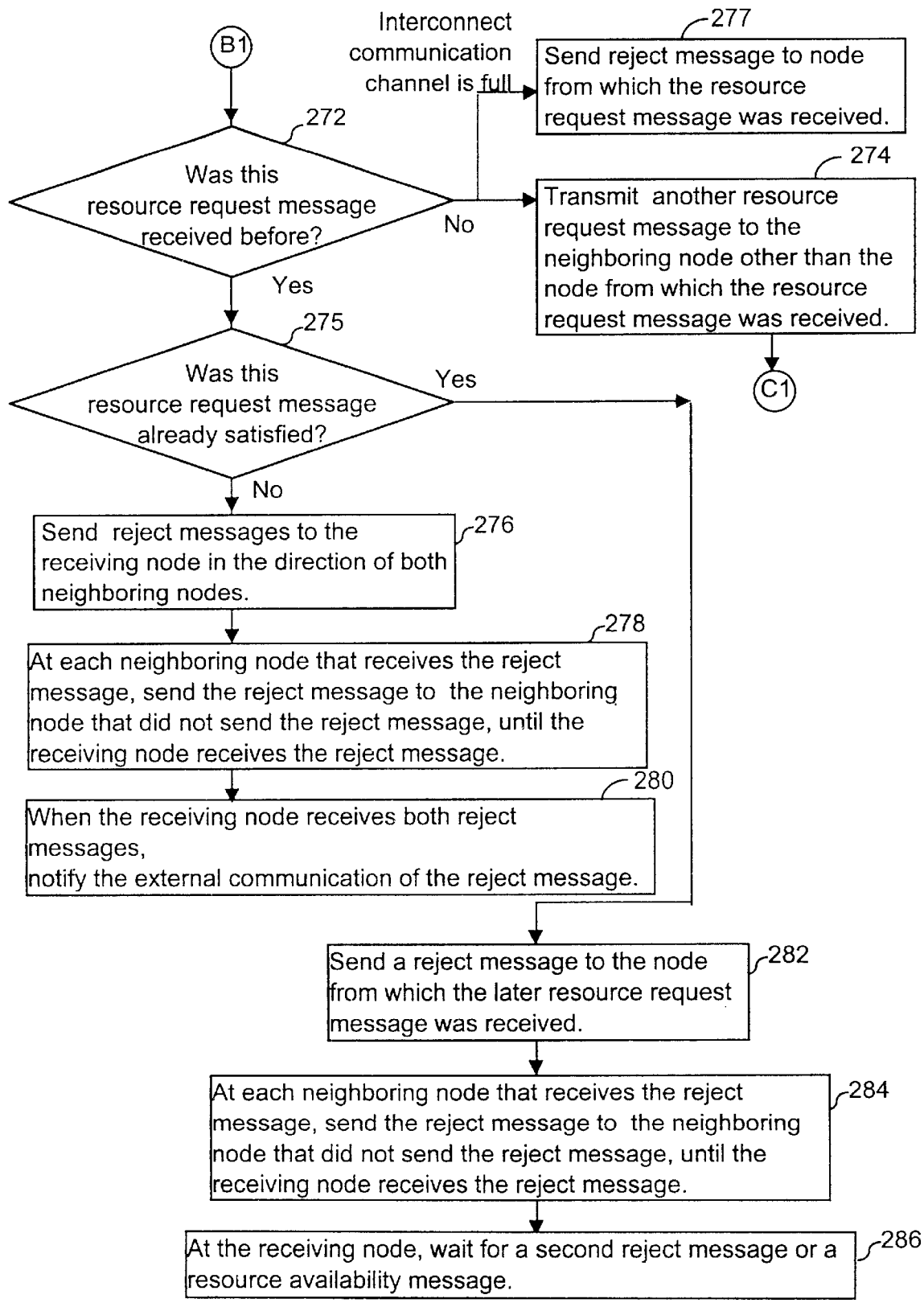

FIGS. 5A and 5B are a detailed flowchart of an embodiment of the method described above with reference to FIG. 2. FIG. 5A begins at step 108 (see FIG. 2) in which the receiving node sends a resource request message to its first and second neighboring nodes to request allocation of a communication resource of the specified type using the send resource message procedure 206 (FIG. 4). In this detailed flowchart, two separate parallel paths 250 and 252 extend from step 108 to show the simultaneous attempt to set up a call path to the target device in two directions. Since the two paths 250, 252 are the same, only one path, path 250, will be described.

In step 254, at the first neighboring node, a resource request message with the message identifier is received using the receive resource message procedure 208 (FIG. 4). In step 256, the neighboring node logs or stores the message identifier in the database using the log message procedure 214 (FIG. 4). In step 258, the neighboring node determines if the communication resource of the specified type is present (i.e., that is capable of forming a connection to the target device). If not, the process proceeds to B1 (FIG. 5B) which will be described below. If so, in step 260, the neighboring node determines if the communication resource of the specified type is available. If the specified type of communication resource is available, in step 262, the neighboring node sends a resource availability message to the node from which the resource request message was received using the send resource available message procedure 209 (FIG. 4).

In step 264, at the receiving node, upon receipt of the resource availability message, the receiving node uses the form communication path procedure 210 (FIG. 4) which invokes the send release message procedure 212 (FIG. 4) to send a release message to the second neighboring node and thereby select a call path. In other words, one communications path is selected by rejecting the other communications path. The form communication path procedure 210 (FIG. 4) forms a communications path to the communication resource of the specified type via the inter-node connections therebetween.

If resource availability messages are received at the receiving node from both the first and second neighboring nodes, a release message is transmitted to one of the neighboring nodes. For instance, the release message may cause both the receiving node and its neighbor to drop the connection between them, which causes the resource request sent to that neighboring node to be abandoned and thus canceled. In practice, the resource availability message will always be received from one neighboring node before the other, or at least the resource availability message from one node will be processed before the other, and therefore receiving simultaneous resource availability messages is generally not a problem. The release message includes the message identifier. Each node receiving the release message aborts its protocol for finding a corresponding resource using that message identifier, and sends a subsequent release message to any neighboring node to which it has sent a communication resource request. In this way, inter-node communication connections on different channels will be released appropriately. In an alternate embodiment in which each node uses the same channel for all the inter-node communication connections, each node receiving a release message aborts its protocol for finding a corresponding resource and forwards a copy of the release message to any neighboring node to which it has sent a communication resource request.

In step 260, if the requested resource is not available, in step 266, the process proceeds to B1 in FIG. 5B. A requested resource is not available under several conditions: all the communication resources of the specified type are in use, the inter-node communication connection to a subsequent node failed, the interconnection to a target device which is of the class of the specified communication resources failed, the subsequent neighboring node is not responding, or another resource request message with the same message identifier was received first and the node is already determining availability.

At B1 in FIG. 5B in step 272, the neighboring node determines if the resource request message was received earlier, such as by using the message collision procedure which will be described below with reference to FIG. 6. If the resource request message was not previously received, and the interconnect communication channel to a next neighboring node is not full, in step 274 the neighboring node transmits another resource request message to the neighboring node other than the node from which the resource request message was received and the process proceeds to step 254. However, if the interconnect communication channel to the next neighbor is full, in step 277 a reject message is sent to the node from which the resource request message was received.

If the resource request message was already received, in step 275, the neighboring node determines whether the earlier resource request message was satisfied. In other words, the neighboring node determines if the specified type of communication resource was assigned to or reserved for the earlier resource request message.

If the earlier resource request message was not satisfied, in step 276, the attempt to form a communications path ("calls") is terminated in both directions because the specified resource is not available via the ring. The neighboring node sends a reject message towards the receiving node in the direction of both neighboring nodes. In other words, two reject messages are sent—one to each neighboring node. In step 278, each neighboring node that receives the reject message, sends the reject message to the neighboring node that did not send the reject message by either transmitting another reject message or forwarding the same reject message as in step 268 described above. In step 280, when the receiving node receives both reject messages, the receiving node notifies the external communication of the reject message.

If in step 275 the earlier resource request message was satisfied, in step 282, the neighboring node sends a reject message in the direction of the node that sent the later arriving resource request message. In step 284, each neighboring node that receives the reject message sends the reject message to the neighboring node that did not send the reject message until the receiving node receives the reject message.

In step 286, the receiving node receives the one reject message and does no further processing until a second reject message or a resource availability message from the other direction is received.

Note that path 250 differs from path 252 at steps 264 and 264a. In step 264, the second neighboring node is released, while in step 264a the first neighboring node is released.

Figure 6:
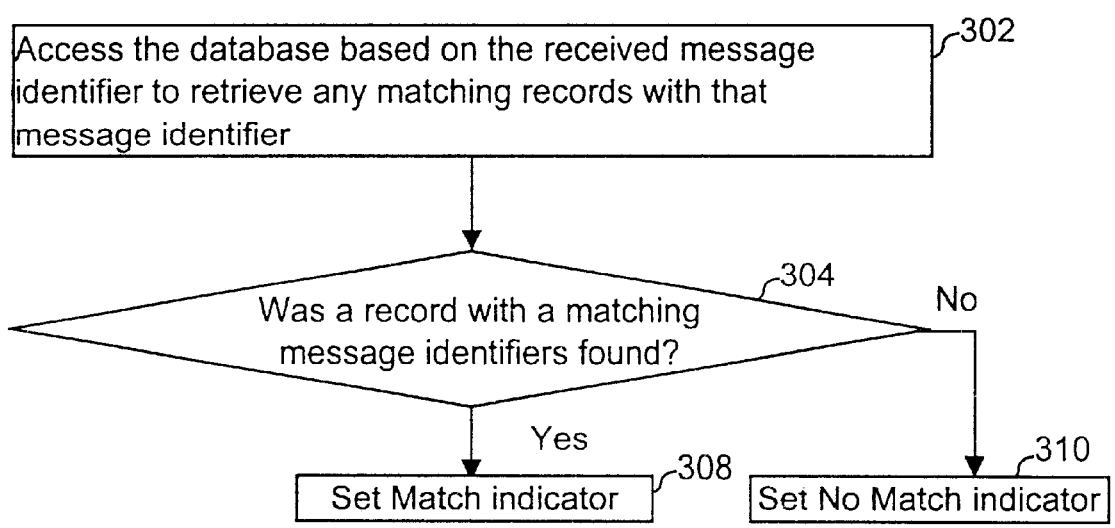
FIG. 6 is a detailed flowchart of a message collision detection procedure.

FIG. 6 is flowchart of a message collision procedure 213 (FIG. 4) used in step 272 of FIG. 5B. In step 302, the node accesses the database based on the received message identifier to retrieve any matching records with that message identifier. Since message identifiers are unique, the database can contain at most one matching record. If a message with a matching identifier is found (304), a match indicator such as a return code or flag is set (308). Otherwise, a no-match indicator is set (308).

A particularly noteworthy aspect of the invention will now be described. Referring back to FIG. 1, a string of nodes 24, 26 is connected to node 18. In this aspect of the invention, node 18 acts as a proxy node for the nodes 24, 28 in the string of nodes and will be described by way of example. Assume that an external communication 54a is received at node 12. Using the method described above, node 12 sends a resource request message in two directions. Assume that the resource request message 16a arrives at node 18 before the resource request message from the other direction 20b.

As a proxy node, node 18 extends its internal check for an available resource of the specified type to include the nodes 24, 26 for which it is acting as a proxy. In particular, at step 260 (FIG. 5A) if node 18 does not have a resource of the specified type available, it forwards the resource request to node 24. Node 24 checks to see if it has available a resource of the specified type and, if not, forwards the request once again, this time to node 26. If any of the nodes for which node 18 is the proxy has an available resource of the specified type, the available resource is allocated and node 18 returns a resource availability message to the calling node (step 262) on behalf of the node with the resource. Alternately stated, the node (24 or 26) with the available resource sends a resource availability message that is forwarded by node 18 to the calling node. The calling node (which sent the request to which node 18 is responding) does not need to know whether the available resource is in node 18 or another node for which node 18 is the proxy, because the resource locating and allocation protocol remains the same. If neither node 18 nor the nodes for which it is a proxy have available a resource of the requested type, node 18 responds to the request in the same way as any other node in the ring 50 (FIG. 1) that does not have available a resource of the requested type. As a result, proxy nodes can be used to extend the resources available to a system to include resources in nodes outside the ring 50.

The communication resources to be allocated by a system implementing the present invention can include switching resources for forming conference telephone calls, as well as "meet-me" telephone calls. For example, cases, the requested resource might be a switch node that is capable of forming a connection to another switch node (or other resource) that represents an established communication connection.

Therefore, a method and apparatus has been provided to connect an external call to a resource that may not be in the node that receives the external call.

The present invention provides a simplified method of operating each node in a set of nodes while providing a robust network that simultaneous searches two or more nodes for the resources needed to complete a call. In addition, because simultaneous attempts are made to find the resource needed to complete a call, connection time is reduced when a failure occurs in the ring.

Alternate Embodiments

If one of the links between the nodes in ring 50 of FIG. 1 is broken, or not implemented in the first place, the ring becomes a linear string of nodes—i.e., nodes that are serially interconnected. Each node in the linear string, except the two at the ends, are coupled to first and second neighboring nodes. All nodes can still be reached by resource requests. Further, as long as the receiving node is near the center of the linear string of nodes, the advantages of simultaneous searching for an available resource are retained. Except for the fact that collision detection (FIG. 6) is no longer needed, the operation of the invention remains unchanged.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of operating a set of nodes to form communication connections, comprising the steps of:

arranging the set of nodes so that at least a subset of the nodes form a ring, such that each node in the subset of nodes is coupled to first and second neighboring nodes in the subset by a set of inter-node communication connections;

receiving an external communication at one of the nodes in the subset of nodes as a receiving node, the external communication requesting access to a communication resource of a specified type;

determining whether the receiving node has the available communication resource of the specified type, and if not, performing additional steps of:

sending a resource request message to the first and second neighboring nodes of the receiving node to request allocation of a communication resource of the specified type;

at each of the first and second neighboring nodes, determining whether that node has an available communication resource of the specified type, and if not, transmitting another resource request message to a neighboring node other than the node from which the resource request message was received; and when any node determines that it has an available communication resource of the specified type, forming a communications path to the communication resource of the specified type via the inter-node communication connections therebetween.

2. The method of claim 1 wherein when any node determines that it has an available communication resource of the specified type, sending a resource availability message from that node towards the receiving node and utilizing the resource availability message at the receiving node when forming the communications path.

3. The method of claim 1 wherein said step of transmitting another resource request message forwards the received resource request to the neighboring node other than the node from which the resource request message was received.

4. The method of claim 1 wherein when any node determines that it has an available communication resource of the specified type, sending a resource availability message from that node to the receiving node.

5. The method of claim 1 wherein the step of sending the resource request message comprises sending the resource request message to the first and second neighboring nodes simultaneously.

6. A method of operating a set of nodes to form communication connections, comprising the steps of:

arranging the set of nodes so that at least a subset of the nodes form a ring, such that each node in the subset of nodes is coupled to first and second neighboring nodes in the subset by a set of inter-node communication connections;

receiving an external communication at one of the nodes in the subset of nodes as a receiving node, the external communication requesting access to a communication resource of a specified type;

determining whether the receiving node has the available communication resource of the specified type, and if not, performing additional steps of:

sending a resource request message to the first and second neighboring nodes of the receiving node to request allocation of a communication resource of the specified type;

at each of the first and second neighboring nodes, determining whether that node has an available communication resource of the specified type, and if not, transmitting another resource request message to a neighboring node other than the node from which the resource request message was received;

when any node determines that it has an available communication resource of the specified type, sending a resource availability message from that node to the receiving node and forming a communications path to the communication resource of the specified type via the inter-node communication connections therebetween; and when the resource availability message is received at the receiving node from either the first or second neighboring nodes, transmitting a release message to the neighboring node that did not send the resource availability message.

7. A method of operating a set of nodes to form communication connections, comprising the steps of:
arranging the set of nodes so that at least a subset of the nodes form a ring, such that each node in the subset of nodes is coupled to first and second neighboring nodes in the subset by a set of inter-node communication connections;
receiving an external communication at one of the nodes in the subset of nodes as a receiving node, the external communication requesting access to a communication resource of a specified type;
determining whether the receiving node has the available communication resource of the specified type, and if not, performing additional steps of:
sending a resource request message to the first and second neighboring nodes of the receiving node to request allocation of a communication resource of the specified type;
at each of the first and second neighboring nodes, determining whether that node has an available communication resource of the specified type, and if not, transmitting another resource request message to a neighboring node other than the node from which the resource request message was received;
when any node determines that it has an available communication resource of the specified type, sending a resource availability message from that node to the receiving node and forming a communications path to the communication resource of the specified type via the inter-node communication connections therebetween; and
when resource availability messages are received at the receiving node from both the first and second neighboring nodes, transmitting a release message to one of the neighboring nodes.

8. The method of claim 1 wherein the resource request message includes a message identifier that identifies the external communication request.

9. The method of claim 8 further comprising the steps of:
at each node, storing in a database the message identifier for each resource request message to form a log;
comparing the message identifier for each received resource request message to the message identifier for at least a subset of the resource request messages in the log; and
transmitting a reject message to both neighboring nodes based on the comparison whereby if any node receives the same resource request message from both neighboring nodes then the communication resource of the specified type is not available in the set of nodes.

10. The method of claim 1 wherein when the communications path is formed to the communication resource of the specified type, when a node other than a node in the formed communications path transmits a resource request message for the communication resource of the specified type, that transmitting node receives a reject message from one of the nodes in the formed communications path.

11. A method of operating a set of nodes to form communication connections, comprising the steps of:
arranging the set of nodes so that at least a subset of the nodes form a ring, such that each node in the subset of nodes is coupled to first and second neighboring nodes in the subset by a set of inter-node communication connections;
receiving an external communication at one of the nodes in the set of nodes as a receiving node, the external communication requesting access to a communication resource of a specified type;
determining whether the receiving node has an available communication resource of the specified type, and if not, performing additional steps of:
sending a resource request message to the first and second neighboring nodes of the receiving node to request allocation of a communication resource of the specified type;
at each of the first and second neighboring nodes, determining whether that node has an available communication resource of the specified type, and if not, transmitting another resource request message to a neighboring node other than the node from which the resource request message was received;
when any node determines that it has an available communication resource of the specified type, sending a resource availability message from that node to the receiving node;
at the receiving node, upon receipt of a single resource availability message, identifying the node that sent the resource availability message as a target node;
at the receiving node, upon receipt of two resource availability messages, selecting one node that sent it one of the resource availability messages as a target node; and
providing a communications path from the received external communication to the communication resource at the target node via the inter-node communication connections therebetween.

12. The method of claim 11 wherein said step of transmitting another resource request message forwards the received resource request to the neighboring node other than the node from which the resource request message was received.

13. The method of claim 11 wherein the step of sending the resource request message comprises sending the resource request message to the first and second neighboring nodes simultaneously.

14. A method of operating a set of nodes to form communication connections, comprising the steps of:
arranging the set of nodes so that at least a subset of the nodes form a ring, such that each node in the subset of nodes is coupled to first and second neighboring nodes in the subset by a set of inter-node communication connections;
receiving an external communication at one of the nodes in the set of nodes as a receiving node, the external communication requesting access to a communication resource of a specified type;
determining whether the receiving node has an available communication resource of the specified type, and if not, performing additional steps of:
sending a resource request message to the first and second neighboring nodes of the receiving node to request allocation of a communication resource of the specified type;
at each of the first and second neighboring nodes, determining whether that node has an available communication resource of the specified type, and if not, transmitting another resource request message to a neighboring node other than the node from which the resource request message was received;
when any node determines that it has an available communication resource of the specified type, sending a resource availability message from that node to the receiving node;

at the receiving node, upon receipt of at least one resource availability message, selecting one node that sent it one of the resource availability messages as a target node;

when one resource availability message is received at the receiving node via from either the first or second neighboring nodes, transmitting a release message to the neighboring node that did not send the resource availability message; and providing a communications path from the received external communication to the communication resource at the target node via the inter-node communication connections therebetween.

15. A method of operating a set of nodes to form communication connections, comprising the steps of:

arranging the set of nodes so that at least a subset of the nodes form a ring, such that each node in the subset of nodes is coupled to first and second neighboring nodes in the subset by a set of inter-node communication connections;

receiving an external communication at one of the nodes in the set of nodes as a receiving node, the external communication requesting access to a communication resource of a specified type;

determining whether the receiving node has an available communication resource of the specified type, and if not, performing additional steps of:

sending a resource request message to the first and second neighboring nodes of the receiving node to request allocation of a communication resource of the specified type;

at each of the first and second neighboring nodes, determining whether that node has an available communication resource of the specified type, and if not, transmitting another resource request message to a neighboring node other than the node from which the resource request message was received;

when any node determines that it has an available communication resource of the specified type, sending a resource availability message from that node to the receiving node;

at the receiving node, upon receipt of at least one resource availability message, selecting one node that sent it one of the resource availability messages as a target node;

when resource availability messages are received at the receiving node from both the first and second neighboring nodes, transmitting a release message to one of the neighboring nodes; and providing a communications path from the received external communication to the communication resource at the target node via the inter-node communication connections therebetween.

16. The method of claim 11 wherein the resource request message includes a message identifier that identifies the communication request.

17. The method of claim 16 further comprising the steps of:

at each node, storing in a database the message identifier for each resource request message to form a log;

comparing the message identifier for each received resource request message to the message identifier for at least a subset of the resource request messages in the log; and transmitting a reject message to both neighboring nodes based on the comparison whereby if any node receives the same resource request message from both neighboring nodes then the communication resource of the specified type is not available in the set of nodes.

18. The method of claim 11 wherein the step of providing a communications path includes bridging the received external communication to the communication resource at the target node via the inter-node communication connections therebetween.

19. A distributed telecommunications processor, for use in each node of a set of nodes arranged so that at least a subset of the nodes form a ring, such that each node in the set of nodes is coupled to first and second neighboring nodes in the set by a set of inter-node communication connections, the distributed telecommunications processor in each node comprising:

a first port for connecting to the first neighboring node;

a second port for connecting to the second neighboring node;

a third port for connecting to an external network;

a memory for storing a node operation procedure; and a processor coupled to the first port, the second port, the third port and the memory, wherein the node operation procedure includes instructions that cause the processor to:

receive an external communication at one of the nodes in the set of nodes as a receiving node via the third port, the external communication requesting access to a communication resource of a specified type, determine whether the communication resource of the specified type is available, and if not, send a resource request message to the first and second neighboring nodes via the first and second ports to request allocation of a communication resource of the specified type, and receive a resource availability message via the first and second ports, and in response to the received resource availability message, form a communications path to the communication resource of the specified type via the inter-node communication connections therebetween; and receive a resource request message for another communication resource of a specified type from a neighboring node, determine whether the node has that communication resource of the specified type, and if not, transmit another resource request message to a neighboring node other than the node from which the resource request message was received, and if the node determines that it has the other communication resource of the specified type, send another resource availability message towards the node from which the resource request message was received.

20. The distributed telecommunications processor of claim 19 wherein the instructions of the node operation procedure for sending of the resource request message include instructions for sending the resource request message to the first and second neighboring nodes simultaneously.

21. A method of operating a set of nodes to form communication connections, comprising the steps of:

arranging the set of nodes so that at least a subset of the nodes are serially interconnected so as to form a linear string of nodes, such that each of a plurality of nodes in the subset is coupled to first and second neighboring nodes in the subset by a set of inter-node communication connections;

receiving an external communication at one of the plurality of nodes in the subset of nodes as a receiving node, the external communication requesting access to a communication resource of a specified type;

determining whether the receiving node has the available communication resource of the specified type, and if not, performing additional steps of:

sending a resource request message to the first and second neighboring nodes of the receiving node to request allocation of a communication resource of the specified type;

at each of the first and second neighboring nodes, determining whether that node has an available communication resource of the specified type, and if not, transmitting another resource request message to a neighboring node other than the node from which the resource request message was received; and when any node determines that it has an available communication resource of the specified type, forming a communications path to the communication resource of the specified type via the inter-node communication connections therebetween.

22. The method of claim 21, wherein the step of forming a communications path includes:

sending to the receiving node a resource availability message from the node that determined it has an available communication resource of the specified type;

at the receiving node, upon receipt of at least one resource availability message, selecting one node that sent it one of the resource availability messages as a target node; and providing a communications path from the received external communication to the communication resource at the target node via the inter-node communication connections therebetween.

23. The method of claim 21 wherein the step of sending the resource request message comprises sending the resource request message to the first and second neighboring nodes simultaneously.

* * * * *